United States Patent
Kim et al.

(10) Patent No.: US 11,038,157 B2
(45) Date of Patent: Jun. 15, 2021

(54) METHOD FOR MANUFACTURING ELECTRODE FOR LITHIUM SECONDARY BATTERY

(71) Applicant: LG CHEM, LTD., Seoul (KR)

(72) Inventors: Cheol-Woo Kim, Daejeon (KR); Jin-Young Son, Daejeon (KR); Hyun-Sik Chae, Daejeon (KR); Sang-Hoon Choy, Daejeon (KR)

(73) Assignee: LG Chem, Ltd.

( * ) Notice: Subject to any disclaimer, the term of this patent is extended or adjusted under 35 U.S.C. 154(b) by 100 days.

(21) Appl. No.: 16/096,537

(22) PCT Filed: Dec. 8, 2017

(86) PCT No.: PCT/KR2017/014422
§ 371 (c)(1),
(2) Date: Oct. 25, 2018

(87) PCT Pub. No.: WO2018/110912
PCT Pub. Date: Jun. 21, 2018

(65) Prior Publication Data
US 2019/0140254 A1    May 9, 2019

(30) Foreign Application Priority Data

Dec. 12, 2016 (KR) .......... 10-2016-0168646
Dec. 7, 2017 (KR) .......... 10-2017-0167733

(51) Int. Cl.
*H01M 4/04* (2006.01)
*H01M 4/139* (2010.01)
(Continued)

(52) U.S. Cl.
CPC ....... *H01M 4/0404* (2013.01); *H01M 4/0416* (2013.01); *H01M 4/0435* (2013.01);
(Continued)

(58) Field of Classification Search
None
See application file for complete search history.

(56) References Cited

U.S. PATENT DOCUMENTS

2003/0113627 A1    6/2003    Choi et al.
2003/0205835 A1*  11/2003    Eastin ................. H01M 4/1391
                                                        264/104
(Continued)

FOREIGN PATENT DOCUMENTS

CN          1498432 A     5/2004
CN        102958844 A     3/2013
(Continued)

OTHER PUBLICATIONS

Park et al., "Novel Solvent-free Direct Coating Process for Battery Electrodes and Their Electrochemical Performance", Journal of Power Sources, vol. 306, Dec. 30, 2015, pp. 758-763.
(Continued)

*Primary Examiner* — Brian R Ohara
(74) *Attorney, Agent, or Firm* — Lerner, David, Littenberg, Krumholz & Mentlik, LLP

(57) ABSTRACT

Disclosed is a method for manufacturing an electrode for a lithium secondary battery, including the steps of: (S1) dry mixing a conductive material and an electrode active material; (S2) dry mixing the resultant product of step (S1) with a binder to obtain electrode mixture powder; and (S3) applying the electrode mixture powder to at least one surface of a current collector. According to an embodiment of the present disclosure, electrode mixture powder is prepared without using a solvent and is applied to a current collector to provide an electrode. Thus, there is no need for a separate drying step. Therefore, the binder and conductive material coated on the surface of electrode active material cause no surface migration phenomenon. As a result, it is possible to
(Continued)

prevent degradation of the adhesion of the electrode, and thus to prevent degradation of the performance of the lithium secondary battery.

12 Claims, 3 Drawing Sheets

(51) Int. Cl.
*H01M 4/1391* (2010.01)
*H01M 4/62* (2006.01)
*H01M 4/66* (2006.01)

(52) U.S. Cl.
CPC ......... *H01M 4/0471* (2013.01); *H01M 4/139* (2013.01); *H01M 4/1391* (2013.01); *H01M 4/621* (2013.01); *H01M 4/622* (2013.01); *H01M 4/625* (2013.01); *H01M 4/661* (2013.01)

(56) References Cited

U.S. PATENT DOCUMENTS

| | | | | |
|---|---|---|---|---|
| 2004/0072072 | A1* | 4/2004 | Suzuki | C01G 53/50 429/231.1 |
| 2005/0266298 | A1* | 12/2005 | Mitchell | H01M 4/625 429/121 |
| 2006/0093920 | A1 | 5/2006 | Cheon et al. | |
| 2010/0330432 | A1 | 12/2010 | Traulsen et al. | |
| 2011/0121225 | A1* | 5/2011 | Posudievsky | H01M 10/0525 252/182.1 |
| 2012/0214070 | A1 | 8/2012 | Yamamoto et al. | |
| 2013/0130113 | A1 | 5/2013 | Takano et al. | |
| 2016/0240847 | A1 | 8/2016 | Kinoshita et al. | |

FOREIGN PATENT DOCUMENTS

| | | |
|---|---|---|
| CN | 103003983 A | 3/2013 |
| CN | 105070879 A | 11/2015 |
| CN | 105895867 A | 8/2016 |
| JP | 2003-263982 A | 9/2003 |
| JP | 2010-10113 A | 1/2010 |
| JP | 2016-72152 A | 5/2016 |
| JP | 2017-62960 A | 3/2017 |
| KR | 10-2003-0050475 A | 6/2003 |
| KR | 10-2005-0052258 A | 6/2005 |
| KR | 10-0599602 B1 | 7/2006 |
| KR | 10-2014-0122500 A | 10/2014 |
| KR | 10-1657742 B1 | 9/2016 |
| TW | 200400281 A | 1/2004 |

OTHER PUBLICATIONS

International Search Report (PCT/ISA/210) issued in PCT/KR2017/014422, dated Apr. 11, 2018.
Ludwig et al., "Solvent-Free Manufacturing of Electrodes for Lithium-ion Batteries", Scientific Reports, Mar. 17, 2016 (Publishing), vol. 6, article No. 23150, pp. 1-10. See abstract; inner pp. 1-3, 8; and figure.
Chinese Search Report for Application No. 201780031008.6, dated Dec. 14, 2020, pp. 1-3.
Search Report from Chinese Office Action for Application No. 201780031008.6 dated Apr. 9, 2021; 3 pages.

* cited by examiner

METHOD FOR MANUFACTURING ELECTRODE FOR LITHIUM SECONDARY BATTERY

TECHNICAL FIELD

The present disclosure relates to a method for manufacturing an electrode for a lithium secondary battery. More particularly, the present disclosure relates to a method for manufacturing an electrode for a lithium secondary battery which does not require any separate drying step after electrode mixture powder is coated on a current collector.

The present application claims priority to Korean Patent Application No. 10-2016-0168646 filed on Dec. 12, 2016 and Korean Patent Application No. 10-2017-0167733 filed on Dec. 7, 2017 in the Republic of Korea, the disclosures of which are incorporated herein by reference.

BACKGROUND ART

As technological development and a need for mobile instruments have increased, a demand for secondary batteries as energy sources has increased rapidly. Among such secondary batteries, lithium secondary batteries which show high energy density and operating potential and has long cycle life and a low self-discharging rate have been commercialized and used widely.

In addition, recently, as the attention to environmental problems has increased, many studies have been conducted about electric vehicles (EV) and hybrid electric vehicles (HEV) capable of substituting for vehicles using fossil fuel, including gasoline vehicles and diesel vehicles, one of the main causes of air pollution. Thus, as a power source for such electric vehicles (EV) and hybrid electric vehicles (HEV), a nickel metal hydride (Ni-MH) battery has been used widely. However, a lithium secondary battery having high energy density, high discharge voltage and output stability has been studied actively and commercialized partially.

A lithium secondary battery has a structure which includes an electrode assembly having a positive electrode and a negative electrode each including an active material coated on a current collector and a porous separator between the positive electrode and the negative electrode, and a lithium salt-containing non-aqueous electrolyte injected thereto.

The electrode for a lithium secondary battery is obtained by applying electrode active material slurry formed by dispersing an electrode active material and a binder or an additive, such as a conductive material, in a solvent to a current collector, and then drying the solvent.

Herein, when drying the solvent, the binder and conductive material coated uniformly on the surface of the electrode active material causes a surface migration phenomenon, resulting in a problem of degradation of the adhesion of the electrode.

When the adhesion of an electrode is degraded as mentioned above, the resistance in the electrode is increased, which is problematic in that the performance of the lithium secondary battery may be degraded.

In addition, recently, development of a high-loading electrode has been required to provide a lithium secondary battery with high capacity. In the case of such a high-loading electrode, such a surface migration phenomenon of a binder and conductive material becomes severe undesirably.

DISCLOSURE

Technical Problem

The present disclosure is designed to solve the problems of the related art, and therefore the present disclosure is directed to providing a method for manufacturing an electrode for a lithium secondary battery which includes preparing an electrode mixture without using a solvent and dry coating the electrode mixture to a current collector.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a method for manufacturing an electrode for a lithium secondary battery, including the steps of: (S1) dry mixing a conductive material and an electrode active material; (S2) dry mixing the resultant product of step (S1) with a binder to obtain electrode mixture powder; and (S3) applying the electrode mixture powder to at least one surface of a current collector.

Herein, each of step (S1) and step (S2) may be carried out through a mechano-chemical reaction.

In addition, the method may further include, after step (S3), a step of allowing the resultant product of step (S3) to pass through hot press rolls.

Meanwhile, when the electrode for a lithium secondary battery is a positive electrode, the electrode mixture powder may be applied to at least one surface of the current collector in a loading amount of 25-50 mg/cm$^2$, in step (S3).

In addition, when the electrode for a lithium secondary battery is a negative electrode, the electrode mixture powder may be applied to at least one surface of the current collector in a loading amount of 12-40 mg/cm$^2$, in step (S3).

Meanwhile, the conductive material may be any one selected from the group consisting of acetylene black, carbon black, ketjen black, graphite and a mixture thereof, or a combination of two or more of them.

In addition, the electrode active material may be positive electrode active material particles or negative electrode active material particles.

Herein, the positive electrode active material particles may be at least one selected from the group consisting of $LiCoO_2$, $LiNiO_2$, $LiMn_2O_4$, $LiCoPO_4$, $LiFePO_4$, $LiNi_{1/3}Mn_{1/3}Co_{1/3}O_2$ and $LiNi_{1-x-y-z}Co_xM1_yM2_zO_2$ (wherein each of M1 and M2 independently represents any one of Al, Ni, Co, Fe, Mn, V, Cr, Ti, W, Ta, Mg and Mo, each of x, y and z independently represents an atomic proportion of an element forming the oxide, $0 \leq x < 0.5$, $0 \leq y < 0.5$, $0 \leq z < 0.5$, and $0 \leq x+y+z \leq 1$).

In addition, the negative electrode active material particles may be at least one selected from the group consisting of: carbonaceous materials such as natural graphite and artificial graphite; lithium-containing titanium composite oxide (LTO) and metals (Me) such as Si, Sn, Li, Zn, Mg, Cd, Ce, Ni and Fe; alloys of the metals (Me); oxides (MeOx) of the metals (Me); and composites of the metals (Me) with carbon.

Meanwhile, the binder may be any one selected from the group consisting of polyvinylidene fluoride, polyvinylidene fluoride-co-hexafluoropropylene, polyvinylidene fluoride-co-trichloroethylene, polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate priopionate, cyanoethyl pullulan, cyanoethyl polyvinyl alcohol, cyanoethyl cellulose, cyanoethyl sucrose, pullulan and carboxymethyl cellulose, or a combination of two or more of them.

In addition, the current collector may include any one of stainless steel; aluminum; nickel; titanium; copper; stainless steel surface treated with carbon, nickel, titanium or silver; and aluminum-cadmium alloy, or a combination of two or more of them.

Advantageous Effects

According to an embodiment of the present disclosure, electrode mixture powder is prepared without using a solvent and is applied to a current collector to provide an electrode. Thus, there is no need for a separate drying step.

Therefore, the binder and conductive material coated on the surface of electrode active material cause no surface migration phenomenon. As a result, it is possible to prevent degradation of the adhesion of the electrode, and thus to prevent degradation of the performance of the lithium secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
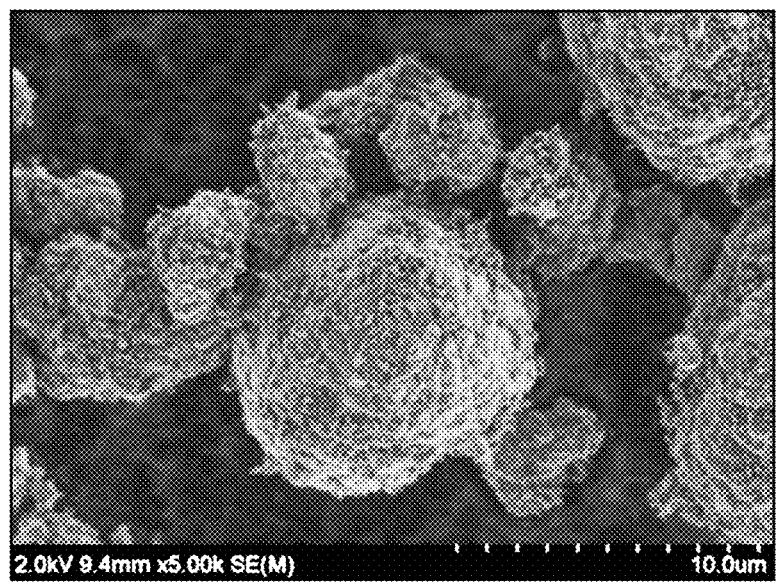
FIG. 1 is a scanning electron microscopic (SEM) image illustrating the electrode active material coated with a conductive material according to Example.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in the description of the present disclosure, detailed description about any related known constitution or function will be omitted, when it is thought that such detailed description makes the scope of the present disclosure obscure. Since the exemplary embodiments are provided so that the present disclosure will fully convey the scope of the present disclosure to those skilled in the art, shapes and sizes of some constitutional elements in the drawings may be exaggerated for the purpose of clearer description.

The method for manufacturing an electrode for a lithium secondary battery according to an embodiment of the present disclosure includes the following steps.

First, a conductive material and an electrode active material are dry mixed (step S1).

Herein, the electrode active material and the conductive material can provide the electrode active material coated with the conductive material through a mechano-chemical reaction.

The mixing step may be carried out at room temperature under a rotation speed of 1,000-2,000 rpm.

Next, the resultant product of step (S1) is dry mixed with a binder to obtain electrode mixture powder (step S2).

Herein, the electrode active material coated with the conductive material and the binder can provide the product of step (S1) whose outer surface is coated with the binder through a mechano-chemical reaction.

The mixing step may be carried out at room temperature under a rotation speed of 1,000-2,000 rpm.

The particles of the resultant product of step (S2) are coated uniformly with the binder on the outer layer thereof. Thus, when applying the resultant particles of step (S2) to a current collector, it is possible to impart adhesion among particles and between particles and the current collector.

Then, the electrode mixture powder is applied to at least one surface of the current collector (step S3).

Herein, after the electrode mixture powder is applied onto the current collector, the resultant product is allowed to pass through hot press rolls so that the current collector and the electrode mixture powder may be compressed, thereby forming an electrode.

Herein, it is possible to control the loading amount of electrode mixture and the thickness of electrode layer by adjusting the gap between the rolls.

According to the related art, electrode mixture slurry prepared in the form of slurry by dispersing an electrode mixture in a solvent is coated to a current collector and then dried to obtain an electrode. Thus, it is essentially required to carry out a drying step to remove the solvent.

However, according to the present disclosure, electrode mixture powder is prepared without using a solvent and is applied directly to a current collector as it is to obtain an electrode. Therefore, no separate drying step is required and the process for manufacturing an electrode can be simplified.

In addition, when carrying out an electrode drying step according to the related art, the binder and conductive material coated uniformly on the surface of the electrode active material causes a surface migration phenomenon, and thus the binder and conductive material may be agglomerated or localized. Due to this, there is a problem of degradation of the adhesion and conductivity of an electrode.

However, according to the present disclosure, no drying step is required and the binder and conductive material cause no surface migration phenomenon. Therefore, it is possible to prevent degradation of the adhesion or conductivity of an electrode, and thus to prevent degradation of the performance of a lithium secondary battery.

Meanwhile, such a surface migration phenomenon of the binder and conductive material becomes severe when a high-loading electrode is dried. Therefore, it can be said that the method for manufacturing an electrode by a dry process according to the present disclosure is particularly effective for the manufacture of a high-loading electrode.

In other words, when the electrode is a positive electrode, it may be a high-loading positive electrode obtained by applying the electrode mixture powder to at least one surface of the current collector in a loading amount of 25-50 mg/cm$^2$. When the electrode is a negative electrode, it may be a high-loading negative electrode obtained by applying the electrode mixture powder to at least one surface of the current collector in a loading amount of 12-40 mg/cm$^2$.

Meanwhile, the conductive material used herein is not particularly limited, as long as it has conductivity while not causing any chemical change in the corresponding current collector and electrode active material. Particular examples of the conductive material include graphite, such as natural graphite or artificial graphite; carbon black, such as carbon black, acetylene black, ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; a conductive metal oxide such as titanium dioxide; a conductive polymer such as a polyphenylene derivative; or the like. Preferably, the conductive material may be any one selected from the group consisting of acetylene black, carbon black, ketjen black, graphite and a combination thereof.

In addition, the conductive material may be used in an amount of 0.1-20 parts by weight, particularly 0.3-12 parts by weight, based on 100 parts by weight of the electrode active material. When the amount of the conductive material is less than 0.1 parts by weight, the conductivity may be decreased and the cycle life of a battery may be degraded. When the amount of the conductive material is larger than 20 parts by weight, the weight of the electrode active material is decreased relatively, resulting in degradation of the performance of a battery.

Further, the electrode active material may be positive electrode active material particles or negative electrode active material particles. The positive electrode active material particles may be obtained by using active material particles selected from the group consisting of LiCoO$_2$, LiNiO$_2$, LiMn$_2$O$_4$, LiCoPO$_4$, LiFePO$_4$, LiNi$_{1/3}$Mn$_{1/3}$Co$_{1/3}$O$_2$ and LiNi$_{1-x-y-z}$Co$_x$M1$_y$M2$_z$O$_2$ (wherein each of M1 and M2 independently represents any one of Al, Ni, Co, Fe, Mn, V, Cr, Ti, W, Ta, Mg and Mo, each of x, y and z independently represents an atomic proportion of an element forming the oxide, $0 \leq x < 0.5$, $0 \leq y < 0.5$, $0 \leq z < 0.5$, and $0 < x+y+z \leq 1$). The negative electrode active material particles may be obtained by using active material particles selected from carbonaceous materials such as natural graphite and artificial graphite; lithium-containing titanium composite oxide (LTO) and metals (Me) such as Si, Sn, Li, Zn, Mg, Cd, Ce, Ni and Fe; alloys of the metals (Me); oxides (MeOx) of the metals (Me); and composites of the metals (Me) with carbon.

In addition, the binder is an ingredient that helps binding between the electrode active material and the conductive material and the adhesion to the current collector, and any material that can be used for an electrode may be used with no particular limitation. Preferably, the binder may be any one selected from the group consisting of polyvinylidene fluoride, polyvinylidene fluoride-co-hexafluoropropylene, polyvinylidene fluoride-co-trichloroethylene, polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate priopionate, cyanoethyl pullulan, cyanoethyl polyvinyl alcohol, cyanoethyl cellulose, cyanoethyl sucrose, pullulan and carboxymethyl cellulose, or a combination of two or more of them.

Further, the binder may be used in an amount of 0.01-50 parts by weight, particularly 0.01-30 parts by weight, based on 100 parts by weight of the electrode active material. When the amount of the binder is less than 0.01 parts by weight, the binding force in the electrode mixture and adhesion to the current collector may be degraded undesirably. When the amount of the binder is larger than 50 parts by weight, the proportion of the electrode active material is decreased relatively, resulting in deterioration of the properties of an electrode and an increase in electrical resistance.

In addition, the current collector that may be used herein includes stainless steel, aluminum, nickel, titanium, copper, stainless steel surface treated with carbon, nickel, titanium or silver, aluminum-cadmium alloy, or the like.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

1. Example

First, 94 parts by weight of LiNi$_{1/3}$CO$_{1/3}$Mn$_{1/3}$O$_2$ as a positive electrode active material and 3 parts by weight of SuperC65 as a conductive material were sprayed into a mechano-chemical system (Nobilta, Hosokawa micron Corporation), and the reaction mixture was agitated and mixed at a rotation speed of 1,000-2,000 rpm under the condition of room temperature while applying an electric current of 15 A thereto. FIG. 1 shows a scanning electron microscopic (SEM) image of the resultant product. Referring to FIG. 1, the conductive material is distributed homogeneously on the surface of the positive electrode active material so that it may function as a conduction channel sufficiently.

Figure 2:
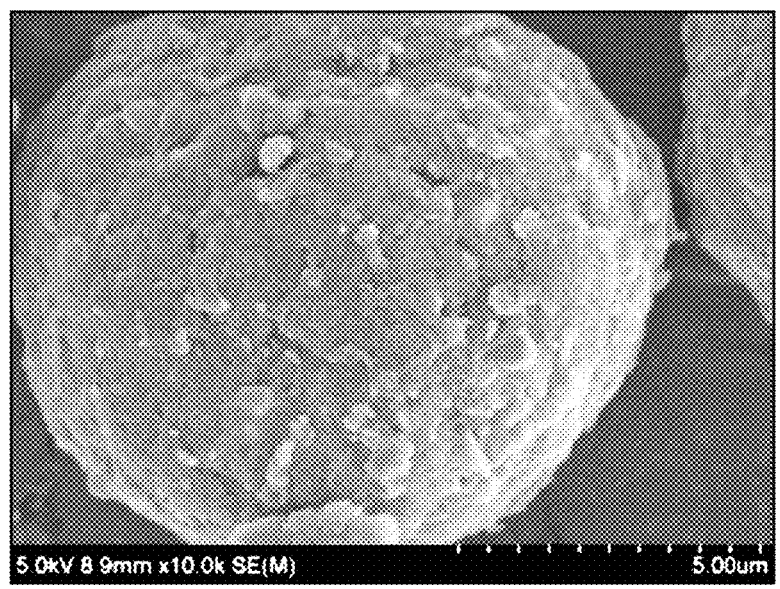
FIG. 2 is a SEM image illustrating the electrode active material coated with a binder according to Example.
Figure 3:
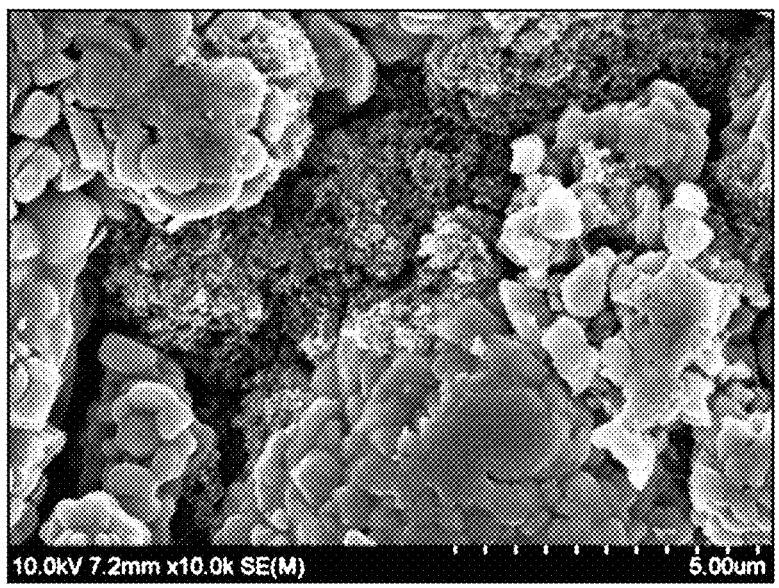
FIG. 3 is a SEM image illustrating the surface of the electrode obtained by a wet process according to Comparative Example 1.

Next, 3 parts by weight of PVDF-co-HFP as a binder was further introduced to the mechano-chemical system and the reaction mixture was agitated ad mixed at a rotation speed of 1,000-2,000 rpm under the condition of room temperature while applying an electric current of 15 A thereto. FIG. 2 shows a SEM image of the resultant product.

Then, the resultant product was scattered uniformly on aluminum foil and allowed to pass through hot-press rollers to obtain an electrode. The hot-press rollers were maintained at a temperature of 120° C. and the pressure between the rollers was controlled to 2,000-4,000 psi.

2. Comparative Example 1

First, 94 parts by weight of the positive electrode active material, 3 parts by weight of the conductive material and 3 parts by weight of the binder used in Example were introduced to NMP as a solvent and uniformly mixed through a PD mixer for 2 hours to prepare a slurry. Herein, the slurry was controlled to a solid content of 68% and a viscosity of 4,000-5,000 cps.

The resultant slurry was scattered uniformly on aluminum foil and allowed to pass through hot-press rollers to obtain an electrode. The hot-press rollers were maintained at a temperature of 120° C. and the pressure between the rollers was controlled to 2,000-4,000 psi.

3. Comparative Example 2

Figure 4:
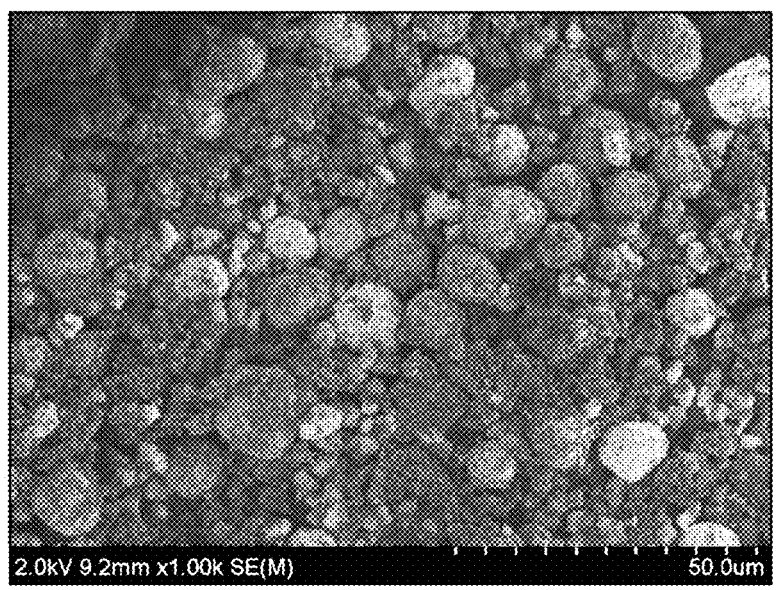
FIG. 4 is a SEM image illustrating the surface of the electrode obtained by dry mixing a conductive material, an electrode active material and a binder at the same time according to Comparative Example 2.

First, 94 parts by weight of $LiNi_{1/3}CO_{1/3}Mn_{1/3}O_2$ as a positive electrode active material, 3 parts by weight of SuperC65 as a conductive material and 3 parts by weight of PVDF-co-HFP as a binder were sprayed into a mechano-chemical system (Nobilta, Hosokawa micron Corporation) at once, and the reaction mixture was agitated and mixed at a rotation speed of 1,000-2,000 rpm under the condition of room temperature while applying an electric current of 15 A thereto. FIG. 4 shows a SEM image of the resultant product. Referring to FIG. 4, the conductive material is not distributed homogeneously on the surface of the positive electrode active material but is agglomerated with the binder, which suggests that homogeneous mixing is not accomplished.

Then, the resultant product was scattered uniformly on aluminum foil and allowed to pass through hot-press rollers to obtain an electrode. The hot-press rollers were maintained at a temperature of 120° C. and the pressure between the rollers was controlled to 2,000-4,000 psi.

4. Determination of Powder Resistance of Electrode Mixture

A powder resistance measuring system (Han-Tech) was used to determine the powder resistance of each of the electrode mixtures according to Example and Comparative Examples.

First, 4 g of a sample was introduced to a cylindrical loading portion and a predetermined pressure was applied thereto. The results of resistance measured under pressurization are shown in FIG. 5.

Figure 5:
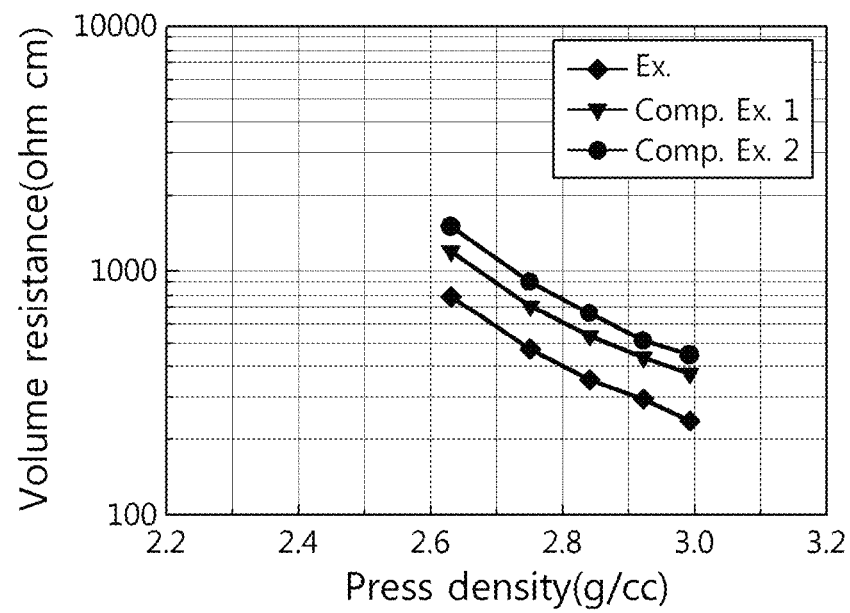
FIG. 5 is a graph illustrating the powder resistance of each of the electrode mixtures according to Example and Comparative Examples.

Referring to FIG. 5, it can be seen that Example shows the lowest resistance. Particularly, in the case of Comparative Example 2 in which the electrode active material, conductive material and binder are introduced at the same time, it shows higher powder resistance as compared to Comparative Example 1 obtained by a wet mixing process.

5. Determination of Adhesion Between Electrode Active Material Layer and Current Collector An adhesion tester (UTM, Instron) was used to determine the adhesion of each of the electrodes according to Example and Comparative Example 1.

An electrode sample was cut into a size of 150 mm×15 mm and the electrode was attached to a double-sided tape. The results of measurement of the force upon 90° peeling are shown in FIG. 6.

Figure 6:
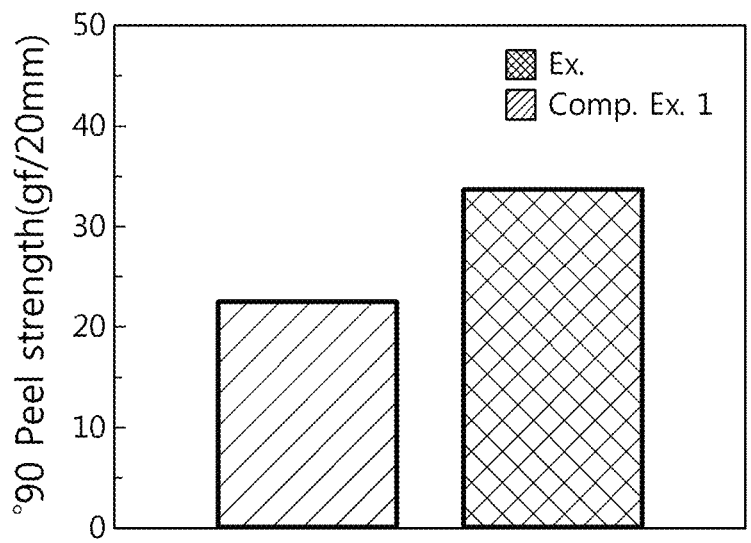
FIG. 6 is a graph illustrating the adhesion between the electrode active material layer and the current collector in each of the electrodes according to Example and Comparative Example 1.

Referring to FIG. 6, it can be seen that Example shows an adhesion improved by about 50% as compared to Comparative Example 1.

The present disclosure has been described in detail. However, it should be understood that the detailed description is for illustrative purposes only and it will be apparent to those skilled in the art that various changes and modifications may be made without departing from the disclosure and scope of the invention as defined in the following claims. Thus, the specific examples of the disclosure are given by way of illustration only and do not limit the scope of the present disclosure. The scope of the present disclosure is defined by the following claims and various changes and modifications within the scope of the disclosure will become apparent to those skilled in the art from this detailed description.

What is claimed is:

1. A method for manufacturing an electrode for a lithium secondary battery, comprising the steps of: (S1) dry mixing and agitating a conductive material and an electrode active material at a rotation speed of 1,000-2,000 rpm; (S2) dry mixing and agitating the resultant product of step (S1) with a binder, at a rotation speed of 1,000-2,000 rpm, to obtain a dry electrode mixture powder; and (S3) applying the dry electrode mixture powder to at least one surface of a current collector, wherein (S1) and (S2) are each carried out through a mechano-chemical reaction.

2. The method for manufacturing an electrode for a lithium secondary battery according to claim 1, which farther comprises, after step (S3), a step of allowing the resultant product of step (S3) to pass through hot press rolls.

3. The method for manufacturing an electrode for a lithium secondary battery according to claim 1, wherein the electrode for a lithium secondary battery is a positive electrode, and in step (S3), the dry electrode mixture powder is applied to at least one surface of the current collector in a loading amount of 25-50 mg/cm².

4. The method for manufacturing an electrode for a lithium secondary battery according to claim 1, the electrode for a lithium secondary battery is a negative electrode, and in step (S3), the dry electrode mixture powder is applied to at least one surface of the current collector in a loading amount of 12-40 mg/cm².

5. The method for manufacturing an electrode for a lithium secondary battery according to claim 1, wherein the conductive material is any one selected from the group consisting of acetylene black, carbon black, ketjen black, graphite and a mixture thereof, or a combination of two or more of them.

6. The method for manufacturing an electrode for a lithium secondary battery according to claim 1, wherein the electrode active material is positive electrode active material particles or negative electrode active material particles.

7. The method for manufacturing an electrode for a lithium secondary battery according to claim 6, wherein the electrode active material is positive electrode active material particles that are at least one selected from the group consisting of $LiCoO_2$, $LiNiO_2$, $LiMn_2O_4$, $LiCoPO_4$, $LiFePO_4$, $LiNi_{1/3}Mn_{1/3}CO_{1/3}O_2$ and $LiNi_{1-x-y-z}Co_xM1_yM2_zO_2$ (wherein each of M1 and M2 independently represents any one of Al, Ni, Co, Fe, Mn, V, Cr, Ti, W, Ta, Mg and Mo, each of x, y and z independently represents an atomic proportion of an element forming the oxide, $0 \leq x < 0.5$, $0 \leq y < 0.5$, $0 \leq z < 0.5$, and $0 < x+y+z \leq 1$).

8. The method for manufacturing an electrode for a lithium secondary battery according to claim 6, wherein the electrode active material is negative electrode active material particles that are at least one selected from the group consisting of: carbonaceous materials; lithium-containing titanium composite oxide (LTO) and metals (Me); alloys of the metals (Me); oxides (MeOx) of the metals (Me); and composites of the metals (Me) with carbon.

9. The method for manufacturing an electrode for a lithium secondary battery according to claim 1, wherein the binder is any one selected from the group consisting of polyvinylidene fluoride, polyvinylidene fluoride-co-hexafluoropropylene, polyvinylidene fluoride-co-trichloroethylene, polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate priopionate, cyanoethyl pullulan, cyanoethyl polyvinyl alcohol, cyanoethyl cellulose, cyanoethyl sucrose, pullulan and carboxymethyl cellulose, or a combination of two or more of them.

10. The method for manufacturing an electrode for a lithium secondary battery according to claim 1, wherein the current collector comprises any one of stainless steel; aluminum; nickel; titanium; copper; stainless steel surface treated with carbon, nickel, titanium or silver; and aluminum-cadmium alloy, or a combination of two or more of them.

11. The method for manufacturing an electrode for a lithium secondary battery according to claim 8, wherein the negative electrode active material particles are carbonaceous materials selected from the group consisting of natural graphite and artificial graphite.

12. The method for manufacturing an electrode for a lithium secondary battery according to claim 8, wherein the negative electrode active material particles are metals (Me) selected from the group consisting of Si, Sn, Li, Zn, Mg, Cd, Ce, Ni and Fe.

* * * * *